United States Patent [19]

Tamura et al.

[11] 4,408,230

[45] Oct. 4, 1983

[54] PHOTOSENSOR ARRAY DEVICE

[75] Inventors: Katsuyoshi Tamura, Mobara; Hiromi Kanai, Chiba, both of Japan

[73] Assignee: Hitachi, Ltd., Tokyo, Japan

[21] Appl. No.: 280,906

[22] Filed: Jul. 6, 1981

[30] Foreign Application Priority Data

Jul. 14, 1980 [JP] Japan .................................. 55-95094

[51] Int. Cl.³ .............................................. H04N 1/12
[52] U.S. Cl. ................................... 358/213; 358/285; 358/293; 358/294
[58] Field of Search ................ 358/294, 213, 293, 285

[56] References Cited

U.S. PATENT DOCUMENTS

| | | | |
|---|---|---|---|
| 3,970,778 | 7/1976 | Adkims | 358/213 |
| 4,149,197 | 4/1979 | Kos et al. | 358/294 |
| 4,189,753 | 2/1980 | Parsons et al. | 358/294 |
| 4,247,874 | 1/1981 | Kos et al. | 358/294 |
| 4,305,100 | 12/1981 | Hattori | 358/294 |

OTHER PUBLICATIONS

Yamamoto, K. et al., "A Contact Type Linear Photodiode Array Using an Amorphous Thin Film", Proceedings of the 9th Conference on Solid State Devices, Japanese Journal of Applied Physics, vol. 17 (1978) pp. 135–140.

*Primary Examiner*—Robert L. Griffin
*Assistant Examiner*—Edward L. Coles
*Attorney, Agent, or Firm*—Charles E. Pfund

[57] ABSTRACT

A photosensor array device is adapted to detect an image of a pattern described on a sending original. The device comprises an optical base having its bottom surface close to the original, a photoelectric conversion element formed above the upper surface of the base plate, a plurality of conductor electrodes each connected at one end thereof to the photoelectric conversion element, and a drive circuit element connected to the other end of each of the conductor electrodes. Disposed on the upper surface of the base is a plate member of an area greater than the area of the upper surface of the base on which the photoelectric conversion element, conductor electrodes and driving circuit element are formed.

2 Claims, 8 Drawing Figures

PHOTOSENSOR ARRAY DEVICE

BACKGROUND OF THE INVENTION

This invention relates to photosensor array devices, and more particularly to a photosensor array device in which a plurality of photosensors for picking up the image on a sending original are arranged in 1:1 dimensional relationship with the sending original with a view to dimensionally reducing and economizing the facsimile transmission system.

FIG. 1 is a longitudinal section illustrating the essential part of a conventional photosensor array device in the facsimile system. In the figure, reference numeral 1 denotes a source of light such as of a light emitting diode, 2 a sending original depicting thereon a pattern for transmission, 3 a contact fiber base having an inclined surface 3a and a bottom surface 3b which oppose the image surface of the sending original and upon which a light signal resulting from the light emitted from the light source 1, directed toward the sending original and then reflected by the image surface, is incident, 4 an optical fiber bundle buried in the base 3 and having one end exposed to the surfaces 3a and 3b and flush therewith, 5 a sandwich fiber base in intimate contact with an upper surface of the contact fiber base 3 and in which the other end portion of the optical fiber bundle 4 is buried such that the terminal surface of the fiber bundle is exposed to the upper surface of the base 5. This optical fiber bundle 4 is formed of a multiplicity of optical fibers put together in the shape of a bundle by fusion or bonding with an adhesive resin, and it is buried in the contact fiber base 3 and the sandwich fiber base 5, with the individual optical fibers extending in the longitudinal direction. Denoted by 6 is a transparent NESA electrode deposited on the upper surface of the sandwich fiber base 5, and by 7 a conductor electrode of a Cr-Au alloy deposited on the NESA electrode 6. This conductor electrode concurrently serves as a wire lead. By 8 is denoted a photoelectric conversion film which is deposited on the sandwich fiber base 5 to cover the end surface of the optical fiber bundle 4, the NESA electrode 6 and the conductor electrode 7. This photoelectric conversion film 8 is formed of a thin film of a Se-As-Te family amorphous substance which is used for a target film in an image pickup tube SATICON. Denoted by 9 is a common electrode to be used for applying a predetermined voltage to the photoelectric conversion film 8.

In the photosensor array device constructed as described above, in order to pick up the sending original 2, the image surface of the sending original 2 is brought into direct surface contact with, or to the close proximity of, the bottom surface of the contact fiber base 3 and the sending original 2 is moved in the direction of arrow. At the same time, light L emitted from the light source 1 is directed onto the image surface of the sending original 2, so that a light signal L' representing the pattern is sent to a light receiving surface 4a of the optical fiber bundle 4 to pass through the optical fiber bundle 4 and reach the photoelectric conversion film 8 at which the light signal L' is converted into an electric signal.

Another conventional photosensor array device of a construction as illustrated in the longitudinal section of FIG. 2 has a photelectric conversion unit formed directly on a contact fiber base 3 without the provision of a sandwich fiber base 5 as illustrated in FIG. 1. As compared with the FIG. 1 device, the FIG. 2 device is advantageous in that the material cost can be reduced because of removal of the base 5 and the fabrication can be simplified since alignment of the optical fiber bundles at the interface of the bases 3 and 5 is not required.

In so-called contact type linear photosensor array devices as described above, since the contact type line sensor neither enlarges nor reduces the image of the sending original 2 by use of a lens system, the resolution of the image is proportional to the size or fineness of the transparent NESA electrodes 6 cooperative with the photoelectric conversion film 8 to act as a photoelectric conversion element. As shown in FIG. 3, the resolution is determined by the number of NESA electrodes 6, each serving to convert light signals into electric signals, which can be disposed effectively beneath the photoelectric conversion film 8. In other words, the resolution is determined by a pitch P at which the multiplicity of NESA electrodes 6 are arranged in spaced relationship. To obtain a resolution of 8 lines per mm which warrants successful reproduction of a practically complete image pattern, for example, the pitch P is required to be as fine as 125 μm (=1 mm÷8). In this case, the conductor electrodes 7 are formed by photoetching process. When the pitch P for the conductor electrodes 7 is of the order of 125 μm or so as described above, the bonding of these conductor electrodes 7 to a drive circuit (not shown) becomes very difficult and often entails problems with reliability.

An improvement aimed at overcoming this difficulty has been proposed wherein the lead wires for the electrode set including the NESA electrodes 6 and conductor electrodes 7 are drawn out alternately on the opposite sides of the photoelectric conversion film 8 so that the individual conductor electrodes 7 may be arranged at a pitch P' of 250 μm as illustrated in FIG. 4.

However, in the devices as shown in FIGS. 1 and 2 wherein the light from the light source 1 is irradiated onto the sending original 2 and reflected on the image surface of the sending original to produce the light signal which is passed through the optical fiber bundle 4 and received on the photoelectric conversion film 8, the following requirements are encountered:

(1) The light source 1 must be disposed in the vicinity of the base 3; and (2) For reduction in the mass of fiber glass used, easiness of the aforementioned alignment and prevention of total reflection, the angle between the optical fiber bundle 4 in the contact fiber base 3 and the bottom surface 3b thereof should preferably approach to 90°.

Accordingly, the distance d from the photoelectric conversion film 8 to the end part of the base 5 or 3 has its own limit. Because of the limitation on this distance d, the device fails to offer a space for disposing a drive circuit. In making an attempt to somehow increase the area proportional to the distance d, it is conceivable that the sandwich fiber base 5 or the contact fiber base 3 could be extended as shown at phantom lines in FIG. 1 or 2. Obviously, this cannot be a practical solution.

For these reasons, the drive circuit is inevitably provided soly on one side with the conductor electrodes provided as shown in FIG. 3. Consequently, the bonding of the drive circuit poses itself as a serious problem.

SUMMARY OF THE INVENTION

This invention accordingly intends to obviate the above conventional drawbacks and has for its object to provide a contact type linear photosensor array device which can assure easiness of the bonding between the conductor electrodes connected to the photoelectric conversion film and the drive circuit to improve reliability of the device.

According to the invention, there is provided a photosensor array device comprising an optical base, a photoelectric conversion element formed above the upper surface of the base, a plurality of conductor electrodes each connected at one end thereof to the photoelectric conversion element, and a drive circuit element connected to the other end of each of the conductor electrodes, characterized by the provision of a plate member of an area greater than the area of the upper surface of the base which is disposed on the upper surface of the base and on which the photoelectric conversion element, conductor electrodes and driving circuit element are formed.

DESCRIPTION OF PREFERRED EMBODIMENTS

Figure 1:
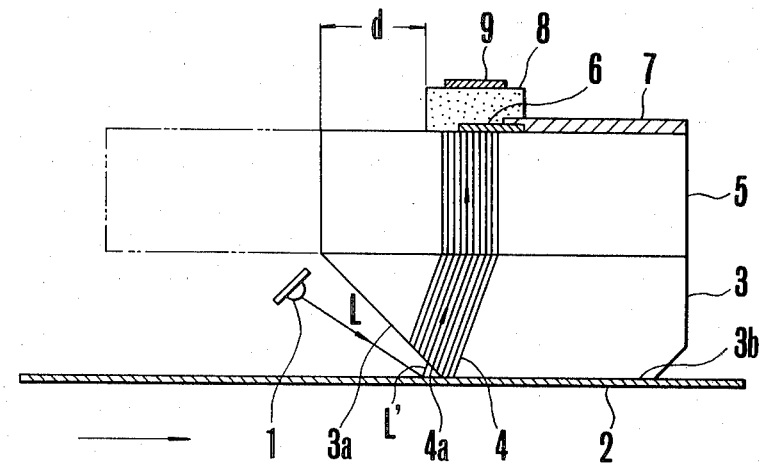
FIGS. 1 through 4 are diagrams for illustrating conventional photosensor array devices.
Figure 2:
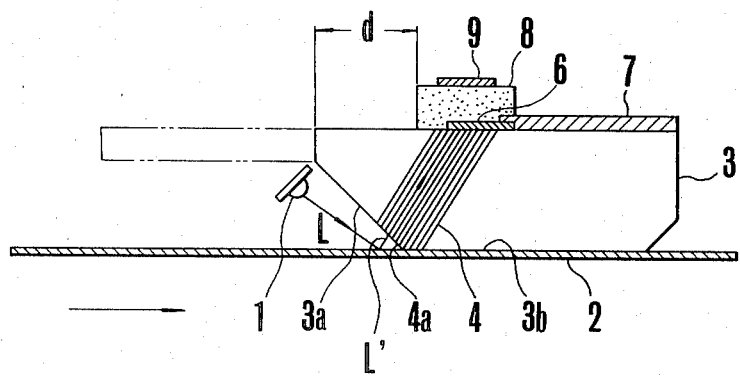
Figure 3:
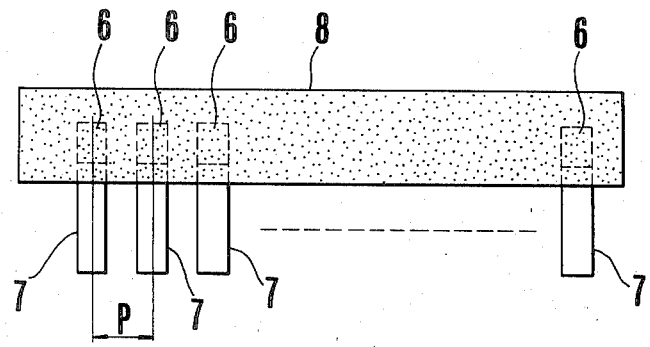
Figure 4:
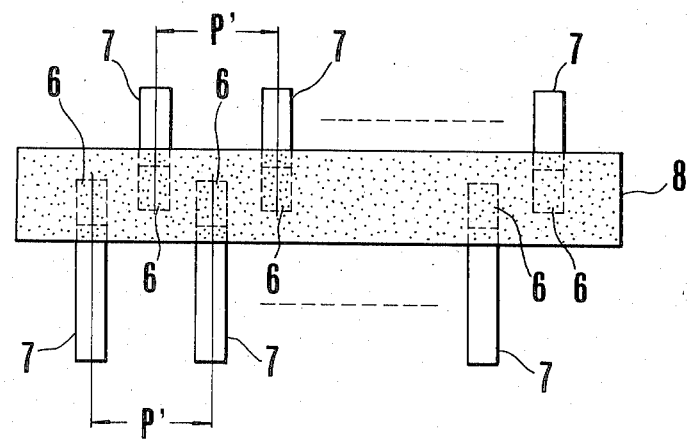
Figure 5A:
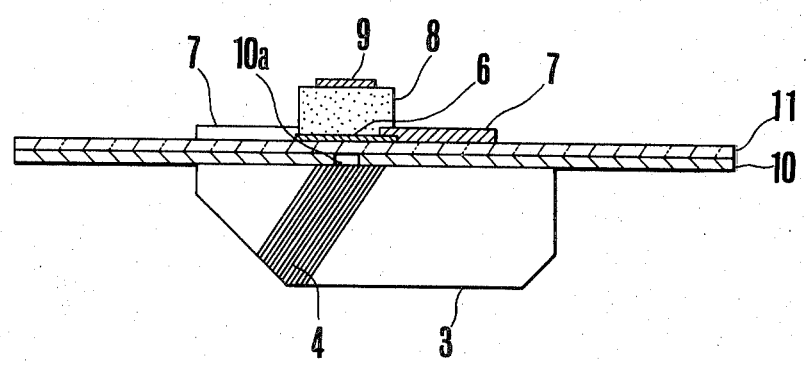
FIGS. 5A and 5B are a sectional view illustrating the essential part of a photosensor array device embodying this invention and a top view of that essential part.
Figure 5B:
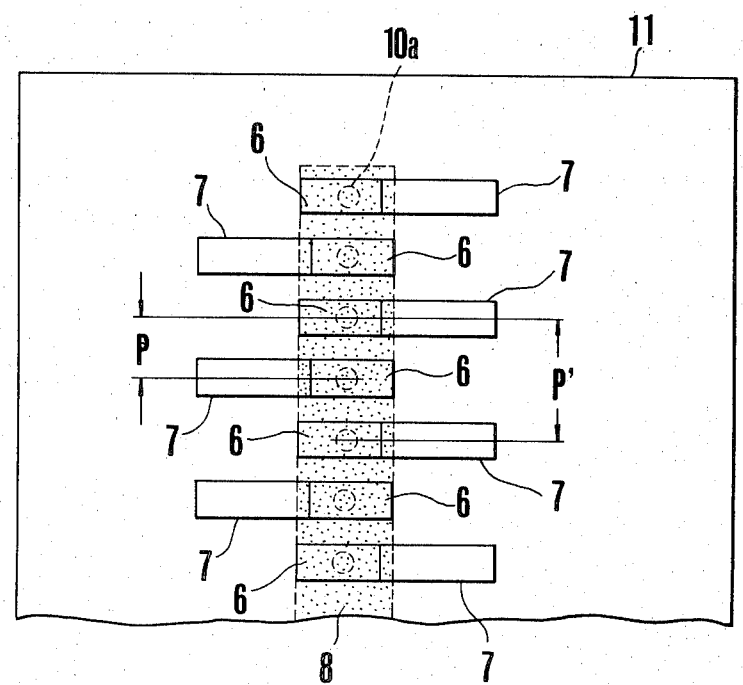
Figure 6:
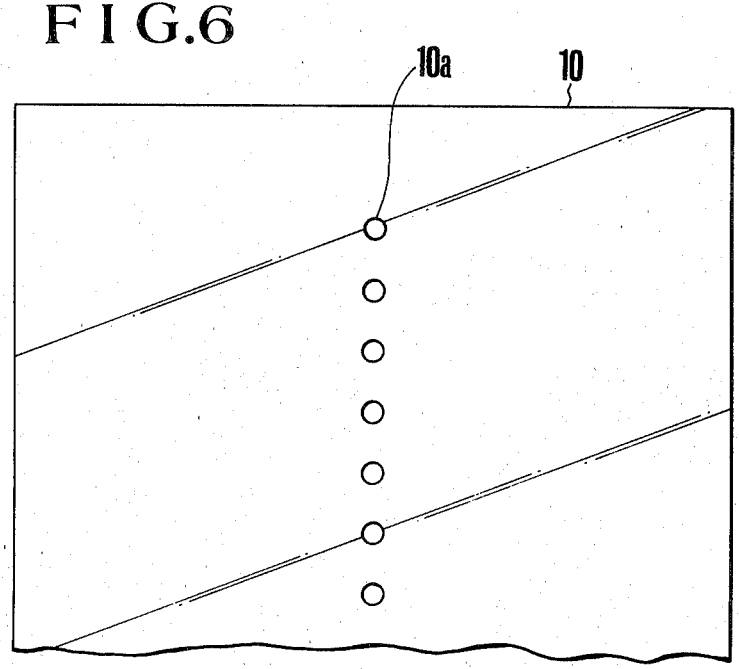
FIG. 6 is a fragmentary plan view illustrating a metal plate to be used in the photosensor array device of the present invention.

FIGS. 5A and 5B are respectively a sectional view of the essential part of a photosensor array device of this invention and a plan view of the essential part. Since the same numerical symbols as those found in the previous diagrams denote the same components, their description is omitted. With reference to FIGS. 5A and 5B, a metal plate 10 having a thickness of about 0.1±0.02 mm is disposed on the upper surface of a contact fiber base 3, having a top configuration as illustrated in FIG. 6. This metal plate 10 has a width W2 about twice a width W1 of the contact fiber base 3. In portions of this metal plate which come into contact with the end surface of the optical fiber bundle 4 on the base 3, small holes 10a having a diameter of the order of 0.07 to 0.12 mm are formed in the longitudinal direction of the metal plate 10 by photo-etching process with equal spacings of a pitch P of 125 μm, and the light signal from the optical fiber bundle 4 is passed through these holes. On the entire upper surface of this metal plate 10, a transparent insulating film 11 of a thickness of about 50 μm is deposited. On the upper surface of the transparent insulating film 11, conductor electrodes 7 are formed corresponding to the small holes 10a with spacings of a pitch P of 125 μm and with their alternate extensions in opposite directions with respect to the arrangement of the aforementioned small holes 10a, so that the adjacent conductor electrodes 7 extended in one same direction are spaced at a pitch P' of 250 μm. Further, on the upper surface of the transparent insulating film 11 and above the small holes 10a spaced at the aforementioned pitch P of 125 μm transparent NESA electrodes 6 are formed, and a photoelectric conversion film 8 of a predetermined width is deposited in the direction in which the conductor electrodes 7 are arranged to cover the NESA electrodes 6. Then, a common electrode 9 is deposited on the upper surface of the photoelectric conversion film 8.

Without the transparent insulating film 11, the formation of transparent NESA electrodes 6 corresponding to the holes 10a is impossible. Therefore, the insulating film 11 serves as a support for the NESA electrode 6. An excessive thickness of the insulating film 11 causes the image to blur and the thickness of the film 11 is preferably dimensioned about 50 μm. The hole 10a formed by photoetching has a diameter which approximates the thickness of the metal plate 10.

In the construction described above, wide areas available for the disposition of driving circuits can be obtained one each on both sides of the photoelectric conversion film 8, including the alternate extensions of the conductor electrodes 7. Moreover, the adjacent conductor electrodes 7 extending in one same direction are spaced at the large pitch P' of 250 μm. Thus, the bonding of the conductor electrodes 7 to their respective drive circuits can be effected with increased ease and consequent highly reliable connections.

Figure 7:
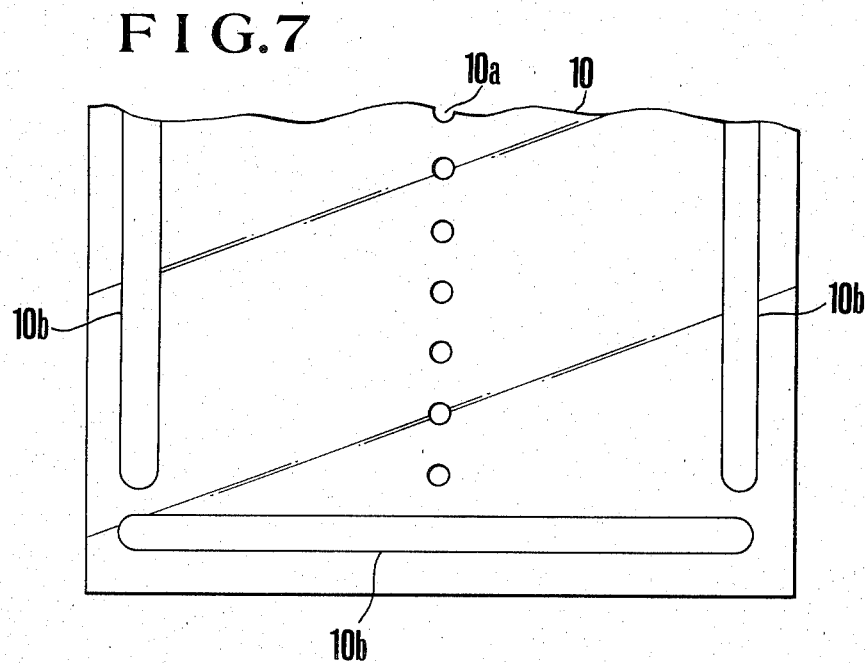
FIG. 7 is a fragmentary plan view of a modified metal plate.

The reason for the aforementioned thickness of about 0.1±0.02 mm applied for the metal plate 10 is that this thickness permits the small holes 10a to be easily bored in the metal plate by etching technique. No other limitation is specifically placed on the plate thickness. Nor are the material, shape, etc. of the metal plate specifically limited. Because of the small thickness, this metal plate 10 is susceptible of deformation. This trouble may be precluded by providing the metal plate along the peripheral portion thereof with reinforcing grooves 10b as shown in FIG. 7.

As concerns the method for operating the photosensor array device, one known method contemplates decreasing the number of bondings involved by driving the conductor electrodes 7 and the common electrode 9 in a matrix fashion. This method by nature necessitates disposition of a matrix wiring on one side of the photoelectric conversion film 8 and a set of blocking diodes on the other side. Thus, distribution of wirings on both sides of the photoelectric conversion film 8 is indispensable for employment of this driving method. In this respect, the present invention is highly advantageous for adoption of this matrix wiring method.

In the embodiment of the invention illustrated above, the plate member to be disposed on the upper surface of the contact fiber base 3 has been described as comprising a combination of a metal plate and a transparent insulating film. The present invention is not limited to this specific combination. Naturally, this invention produces entirely the same effect as described above by replacing the metal plate with a glass plate or a ceramic plate.

As described above, according to the present invention, the bonding of the conductor electrodes on the photoelectric conversion film to the external driving circuits is effected very easily. The invention, accordingly, provides an excellent effect such as producing the bonding with high reliability.

What is claimed is:

1. In a photosensor array device comprising an optical base having its bottom surface close to an original, a photoelectric conversion element formed above the upper surface of the base, a plurality of conductor electrodes each connected at one end thereof to the photoelectric conversion element, and a drive circuit element connected to the other end of each of the conductor electrodes, the improvement wherein said device comprises a metal plate and a transparent insulating plate in combination of an area greater than the area of the upper surface of the base which is disposed on the upper surface of the base and on which the photoelectric conversion element, conductor electrodes and driving circuit element are formed and wherein said metal plate is formed with reinforcing grooves.

2. In a photosensor array device comprising an optical base having its bottom surface close to an original, a photoelectric conversion element formed above the upper surface of the base, a plurality of conductor electrodes each connected at one end thereof to the photoelectric conversion element, and a drive circuit element connected to the other end of each of the conductor electrodes, the improvement wherein said device comprises a metal plate and a transparent insulating plate in combination of an area greater than the area of the upper surface of the base which is disposed on the upper surface of the base and on which the photoelectric conversion element, conductor electrodes and driving circuit element are formed and wherein said metal plate is formed with a plurality of holes arranged at a predetermined pitch in the longitudinal direction of the metal plate and wherein said conductor electrodes are provided to extend alternately in the opposite directions with respect to the arrangement of the holes.

* * * * *